(12) United States Patent
Mattingly

(10) Patent No.: US 6,463,723 B1
(45) Date of Patent: Oct. 15, 2002

(54) SIDE MOUNT SICKLE MOWER

(76) Inventor: Herbert Lee Mattingly, 14681 County Rd. 6530, Moody, MO (US) 65777

( * ) Notice: Subject to any disclaimer, the term of this patent is extended or adjusted under 35 U.S.C. 154(b) by 0 days.

(21) Appl. No.: 09/705,034

(22) Filed: Nov. 2, 2000

Related U.S. Application Data

(60) Provisional application No. 60/163,302, filed on Nov. 3, 1999.

(51) Int. Cl.[7] .................. A01D 34/03; A01D 34/43; A01D 34/64
(52) U.S. Cl. .................................. 56/15.6; 56/15.7
(58) Field of Search ................. 56/15.6, 15.7, 56/15.2, 15.8, 16.3, 264

(56) References Cited

U.S. PATENT DOCUMENTS

| | | | |
|---|---|---|---|
| 2,311,095 A | | 2/1943 | Simpson et al. |
| 2,580,266 A | * | 12/1951 | Abgarian .................... 56/10.4 |
| 2,699,025 A | | 1/1955 | Goss |
| 2,779,145 A | * | 1/1957 | Smith .......................... 56/10.4 |
| 3,109,272 A | * | 11/1963 | Hedtke ....................... 56/15.2 |
| 3,234,718 A | * | 2/1966 | Wathen ....................... 56/10.9 |
| 3,596,452 A | * | 8/1971 | Scarnato ....................... 56/256 |
| 3,791,115 A | * | 2/1974 | Nelsen et al. ................ 56/15.2 |
| 3,958,400 A | | 5/1976 | Sorensen et al. |
| 4,179,870 A | * | 12/1979 | Rowse ............................. 56/6 |

FOREIGN PATENT DOCUMENTS

DE        3419112 A1 * 5/1986 .......... A01D/34/86

\* cited by examiner

*Primary Examiner*—Robert E. Pezzuto
*Assistant Examiner*—Árpád F. Kovács
(74) *Attorney, Agent, or Firm*—Linda L. Lewis; Greensfelder, Hemker & Gale, P.C.

(57) ABSTRACT

A mower attachment for a tractor having a base plate that can be attached to the tractor; an inner arm rotatably attached to the base plate, wherein the inner arm has an end plate; an outer plate attached to the end plate of the inner arm; a mower yoke attached to the outer plate; and an oscillating sickle with a sickle head and a cutterbar, wherein the sickle head rotatably nests in the mower yoke, and the cutterbar can rotate more than about 140° while the sickle is operating.

5 Claims, 14 Drawing Sheets

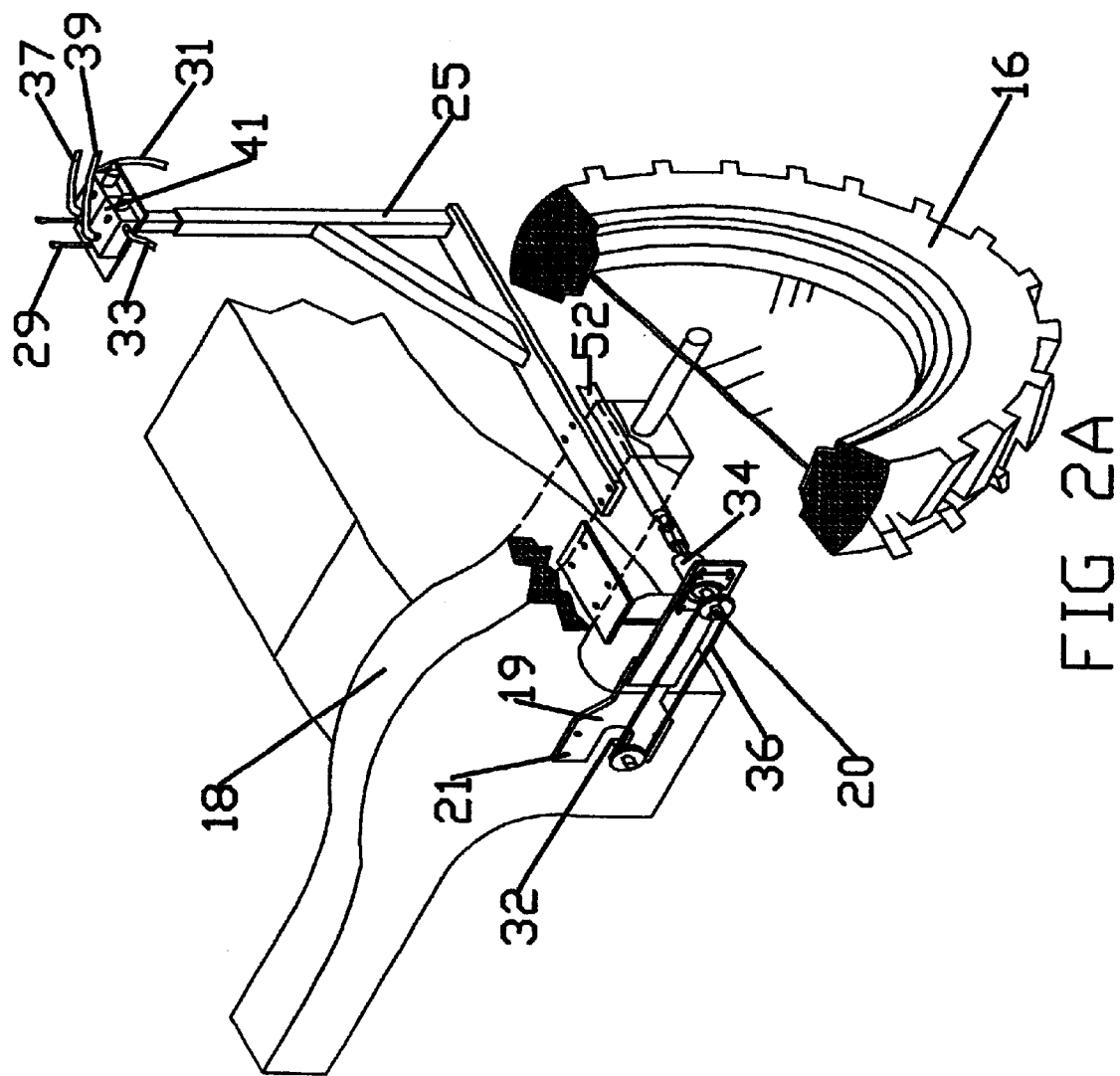

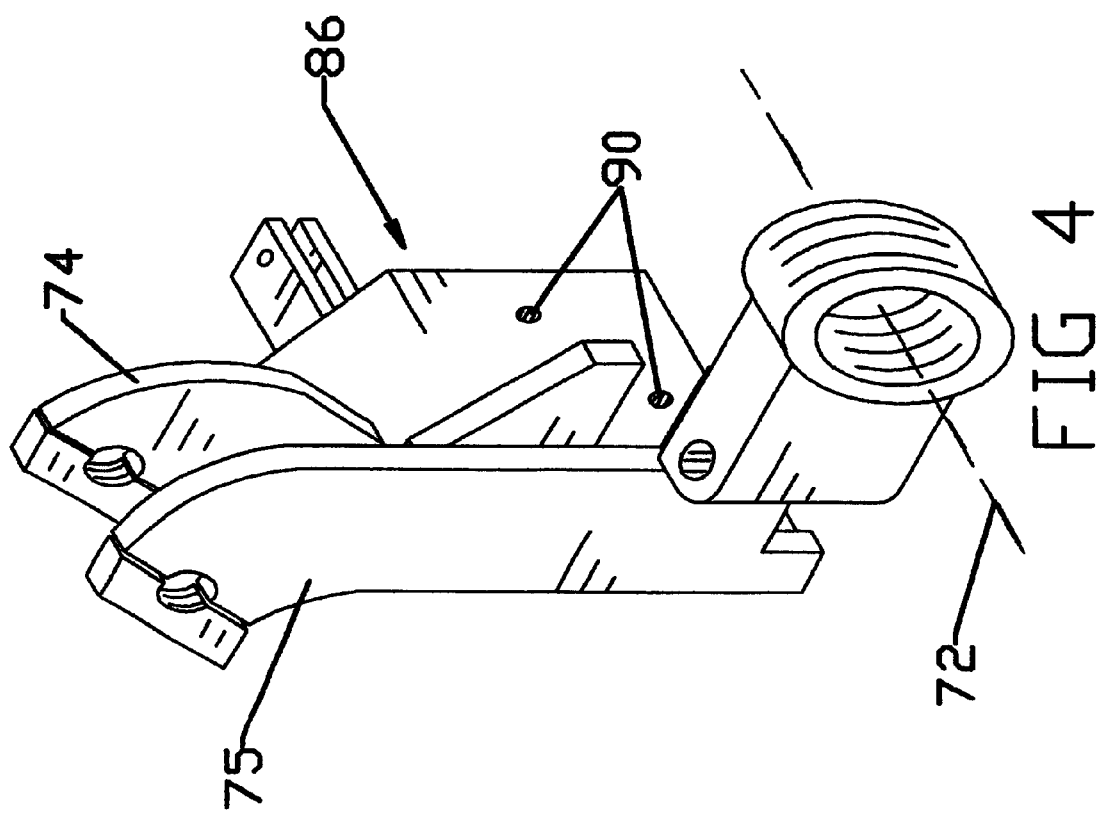

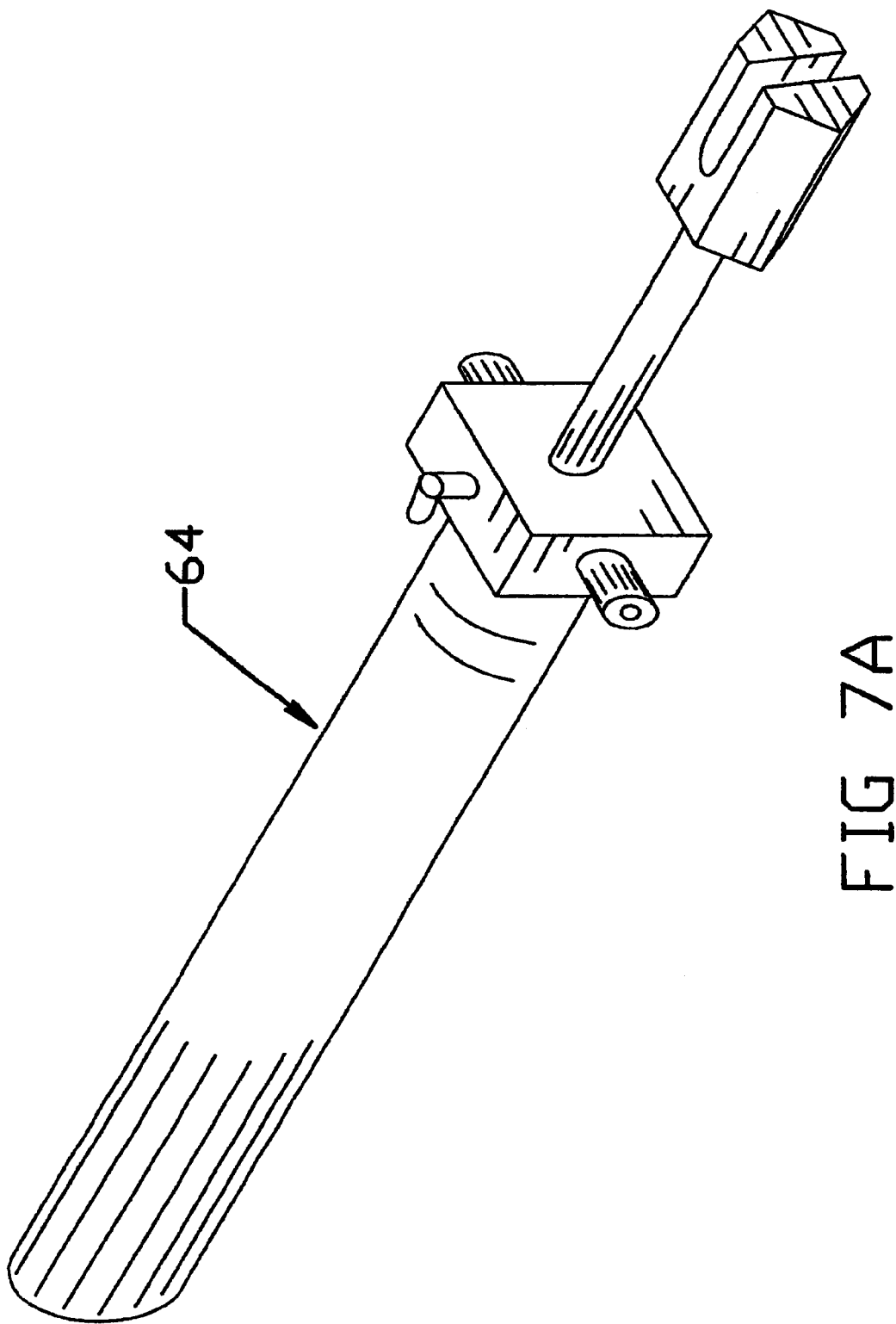

SIDE MOUNT SICKLE MOWER

The present nonprovisional application claims the benefit of U.S. Provisional Application No. 60/163,302 filed Nov. 3, 1999.

FIELD OF THE INVENTION

This invention is related to sickle bar mowers and, particularly, to a sickle bar mower suitable for mounting on or attaching to the side of a tractor, that allows the operator to raise and lower the bar while operating the sickle bar. More particularly, this invention allows the operator to rotate the bar more than 140° by at least two rotation means. One means is on the inner arm and the other means is on the head yoke.

BACKGROUND OF THE INVENTION

Side mounted sickle mowers are used to mow fields and roadsides. When mowing roadsides, it is necessary to maneuver around obstacles such as signs and trees. The cutterbar of mowers known in the art have to be turned off to raise the mower 90° to allow the mower to pass such obstacles. The present invention allows the cutter bar to be raised 90° while still operating, saving the operating time to stop and restart the cutterbar to resume mowing. On uneven ground, mowers known in the art have limited rotation downward to allow the grass to be mowed effectively on downward slopes. The mower of the present invention allows the cutterbar to be rotated downward to about 60° below the horizontal to mow on downward slopes.

U.S. Pat. No. 3,958,400 discloses a sidemounted mower designed to reduce the transmission of vibration from the sickle to the tractor. This reduction is accomplished with a pair of laterally spaced links interconnecting the hitch frame with the drag bar and cutterbar assembly to form a generally horizontal four bar linkage having one rigid corner, the link adjacent the rigid corner being resilient in the transverse direction. The apparatus provides for the rotating of the cutterbar 61 around the pin 63, thereby raising the outer end of the cutterbar. Such pivoting, however, is less than 90°, and appears from FIG. 2 in U.S. Pat. No. 3,958,400 to be about 45°.

U.S. Pat. No. 2,311,095 discloses a side mower for tractors, wherein a lever is connected to the drag bar of the mower, wherein the lever has a floating mounting in the tractor of distortable elastic material in compression and in torsion. The mower has a lever 54 fixed to the shoe 7 on which is mounted the cutter bar 1. The shoe 7 is pivotally supported at 8 and 9 on the frame member 10. However, rotation while operating is limited, because of the aligning of the pitman 4 with the cutterbar 1, restricting the amount of rotation while operating the cutterbar.

U.S. Pat. No. 2,699,025 discloses a cutter bar mounted on a drag bar wherein the drag bar has a universal connection, a pull bar extending forwardly from the drag bar, a slotted plate carried by the tractor forwardly of the drag bar, and resilient abutment means at the forward end of the pull bar. The cutterbar can rotate upwardly or downwardly about 15° while operating (see FIGS. 5 and 6). The cutterbar can rotate a full 90° upward, but not while operating the cutterbar.

None of the above references disclose the claimed cutterbar for attachment to a tractor, wherein the side-mounted cutterbar can be operated while being rotated from about 90° above the horizontal to about 60° below horizontal.

SUMMARY OF THE INVENTION

A mower attachment for a tractor comprising a base plate attached to the tractor, an inner arm rotatably attached to the base plate, wherein the inner arm has an end plate; an outer plate attached to the end of the inner arm; a mower yoke attached to the outer plate; and an oscillating sickle with a sickle head and a cutterbar. The sickle head rotatably nests in the mower yoke. The cutterbar can rotate more than about 140° while the sickle is operating. The attachment can be side-mounted on a tractor.

DESCRIPTION OF THE DRAWINGS

The present invention is embodied in, but not limited to the following figures.

FIG. 2A is a rear portion of a right rear perspective view of an enlarged fragmentary view of the mower attached to a tractor.

FIG. 4 is an enlarged perspective view of the rear portion of the mower yolk.

FIG. 7A is an enlarged perspective view of the telescoping hydraulic cylinder.

2DESCRIPTION OF THE PREFERRED EMBODIMENT

Figure 1:
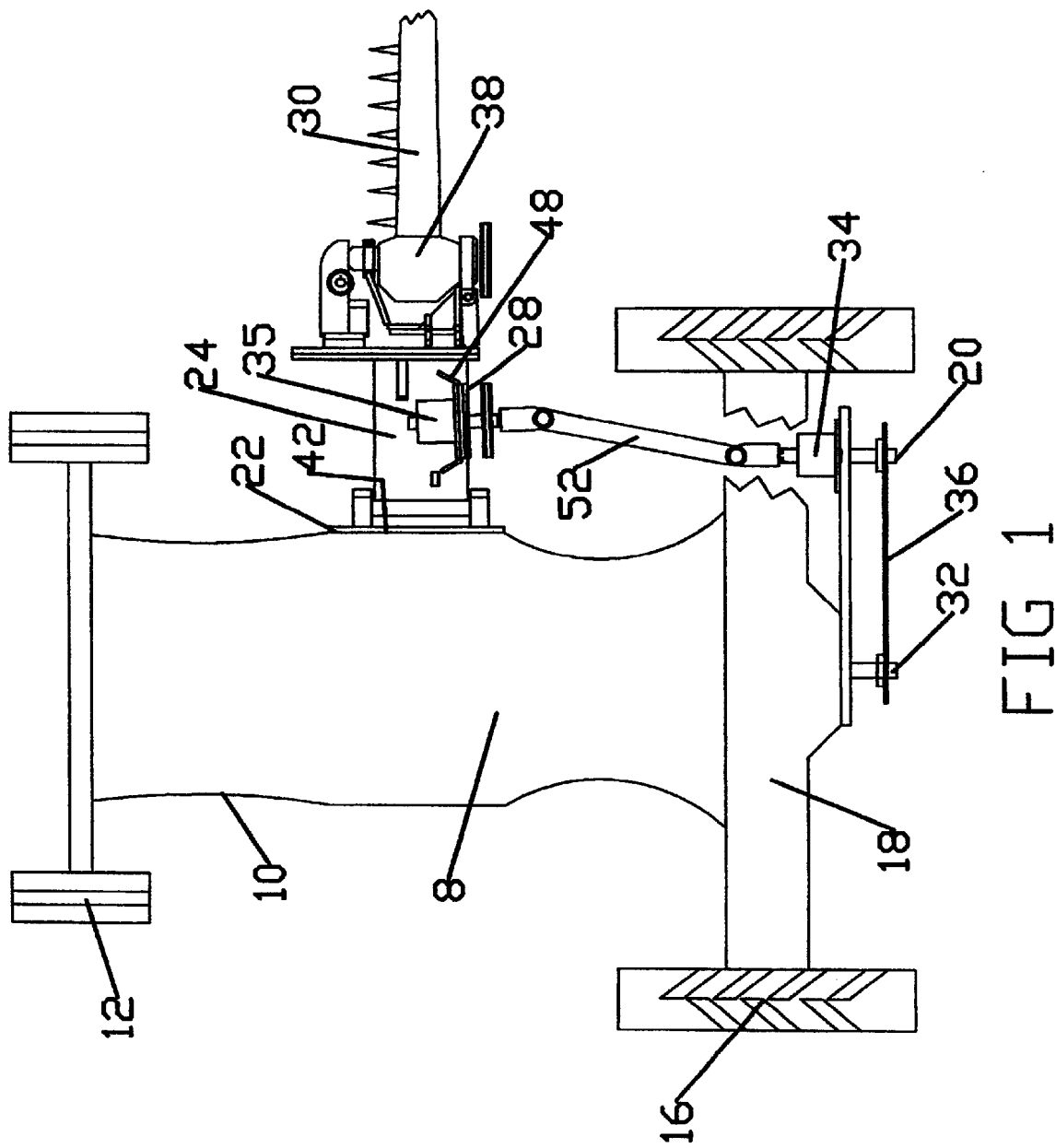
FIG. 1 is a top view of a sickle bar mower incorporating the present invention.

As shown in FIG. 1, base plate 22 is attached to frame 10 of tractor 8. Base plate 22 is secured by bolts through bolt holes 42 to the flanges of the transmission housing of tractor 8. The tractor transmission housing is a casting. By bolting base plate 22 to the flanges of the housing the load is applied at the point of greatest strength and breakage of the cast housing is prevented. Base plate 22 is attached to tractor 8 between front tires 12 and rear tires 16.

As shown in FIG. 2A, drive shaft 52 is mounted under differential housing 18. Power take-off shaft 32 is attached to rear bearing shaft 20 by means of a chain drive 36. Rear bearing housing 34 is attached to mount 19 which supports rear bearing shaft 20 and the drive shaft 52. Rear mount plate 19 is attached to differential housing 18 by bolts 21. Chain drive 36 is covered with a chain guard, not shown.

Figure 2B:
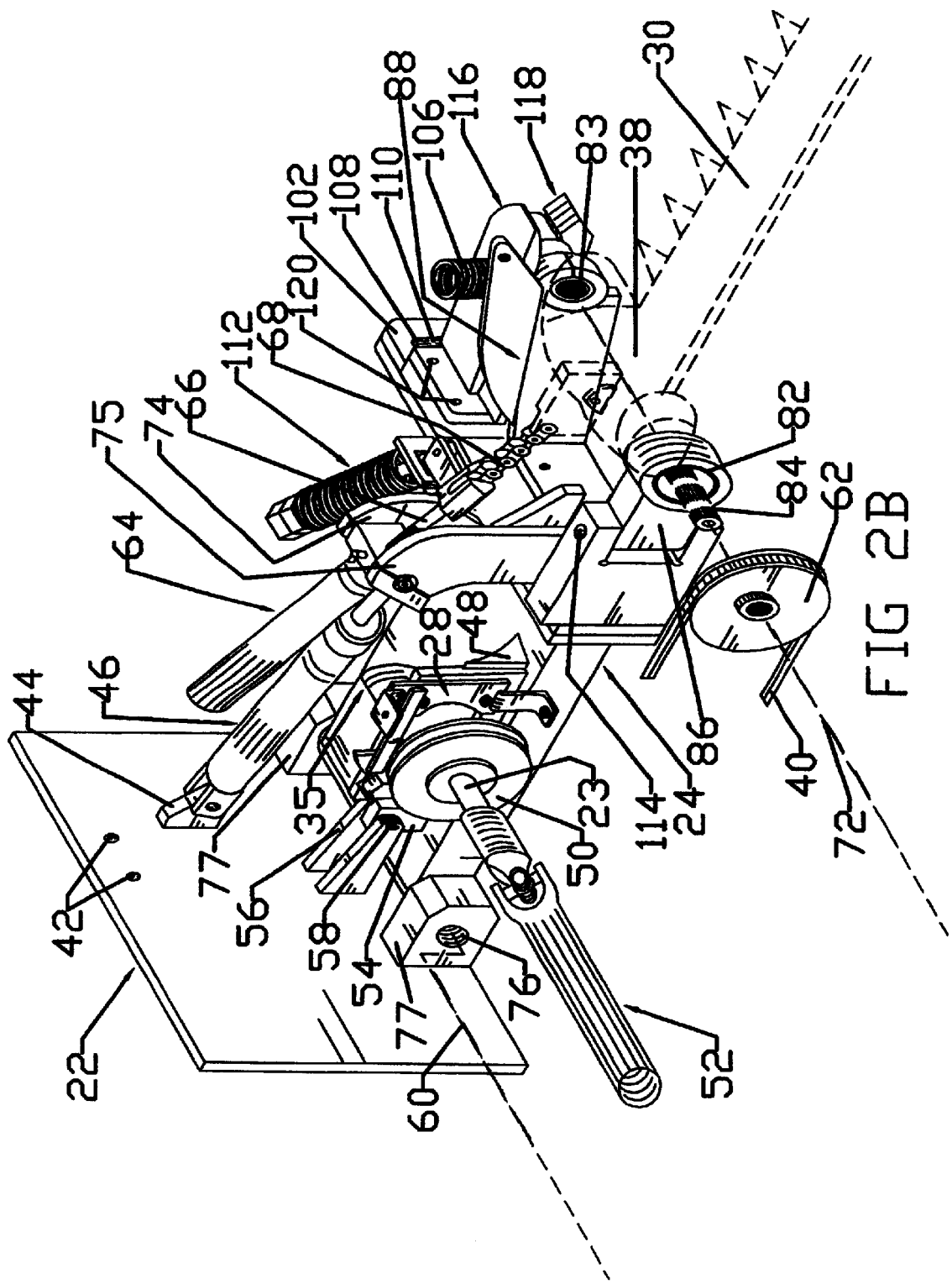
FIG. 2B is a forward portion of a right rear perspective view of an enlarged fragmentary view of the mower attached to a tractor.
Figure 7B:
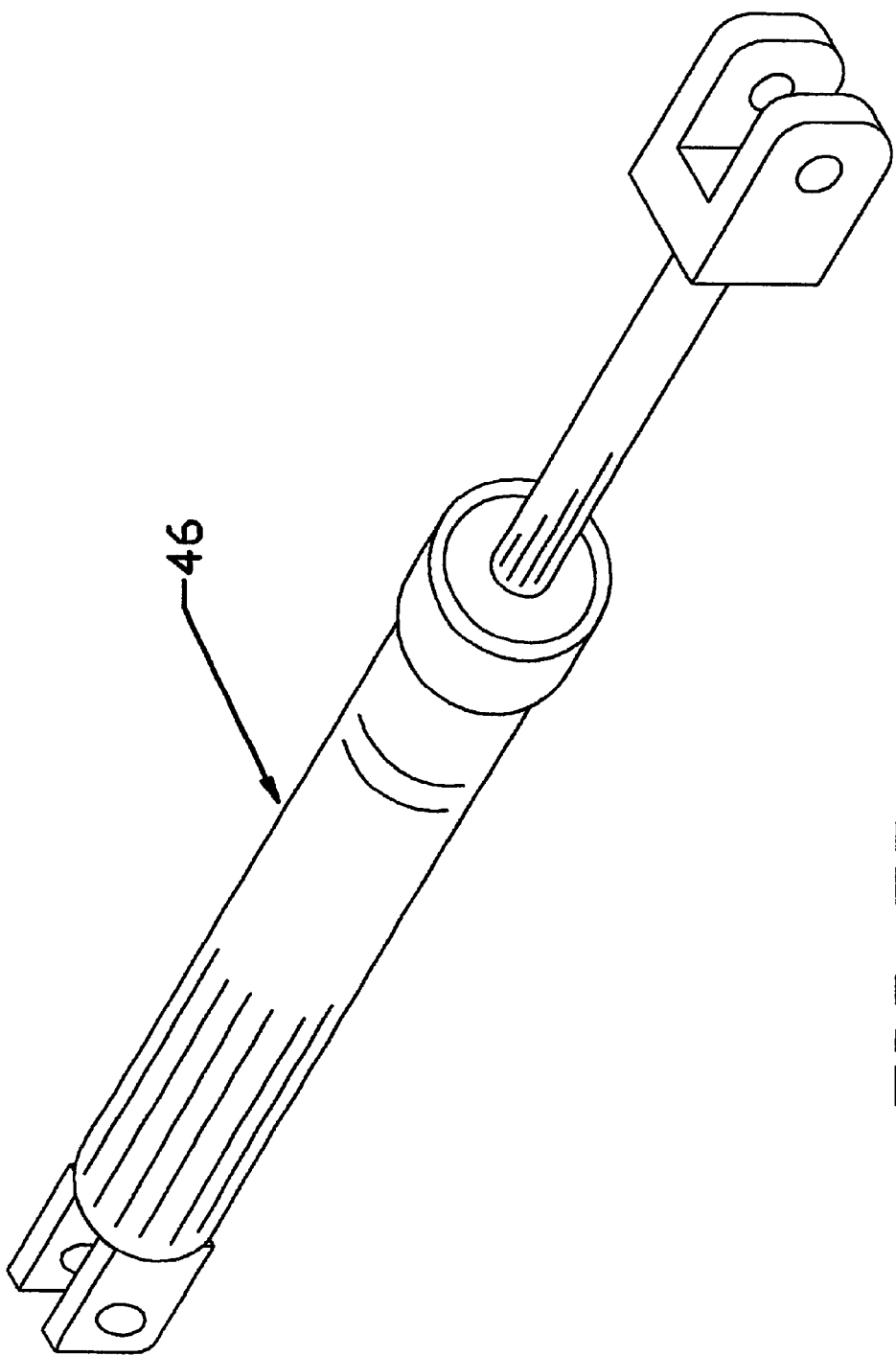
FIG. 7B is an enlarged perspective view of the telescoping inner arm hydraulic cylinder.
Figure 11:
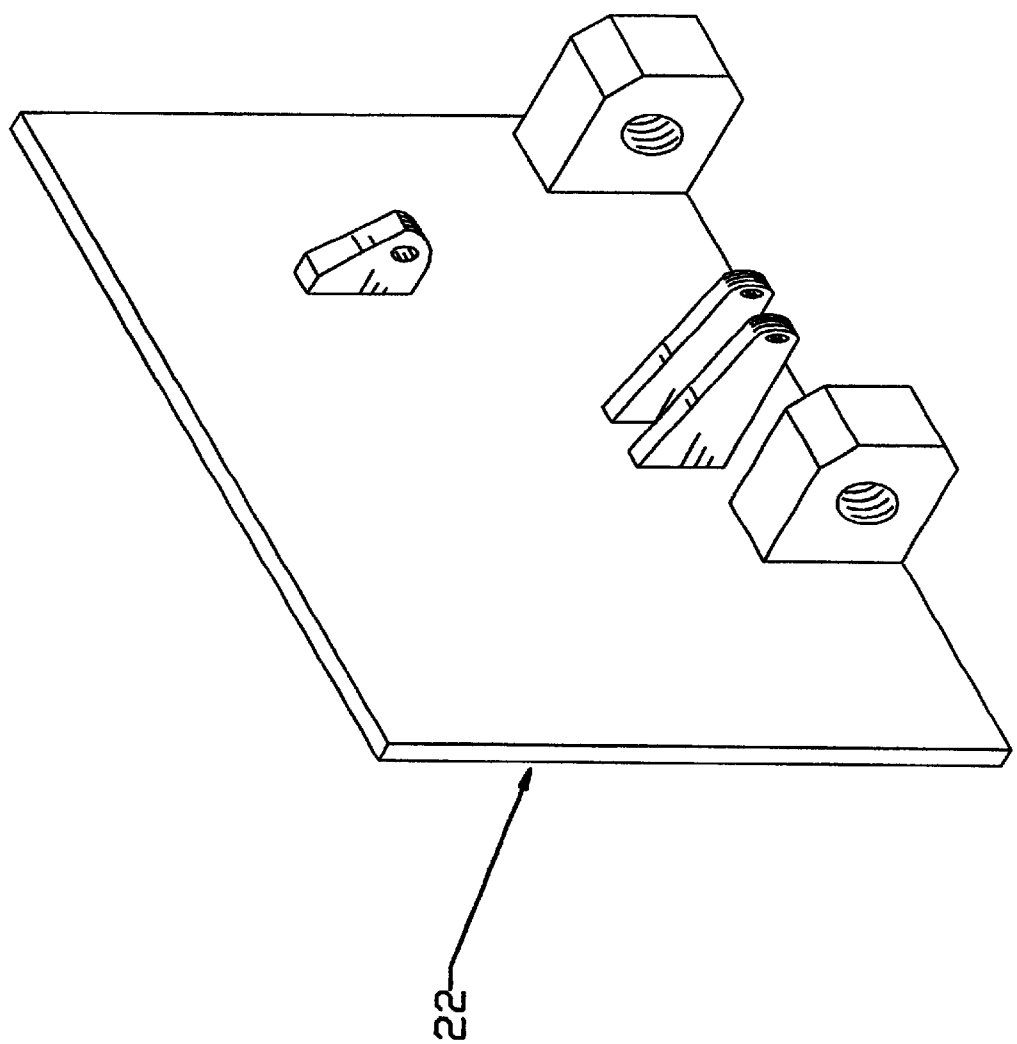
FIG. 11 is an enlarged perspective view of the base plate.

Referring to FIG. 2B, inner arm 24 is rotatably attached to base plate 22 at hole 76 through bosses 77 which are welded to base plate 22. A shaft (not shown) passes through bosses 77 and inner arm 24. Telescoping inner arm hydraulic cylinder 46 (shown in FIG. 7B) is attached to base plate 22 (shown in FIG. 11) at boss 44. The other end of the inner arm hydraulic cylinder 46 is attached to inner arm at boss 45. Hydraulic cylinder 46 retracts to rotate, at dashed line 60, cutterbar 30 upward. The cutterbar 30 may be operating while rotating.

Figure 5:
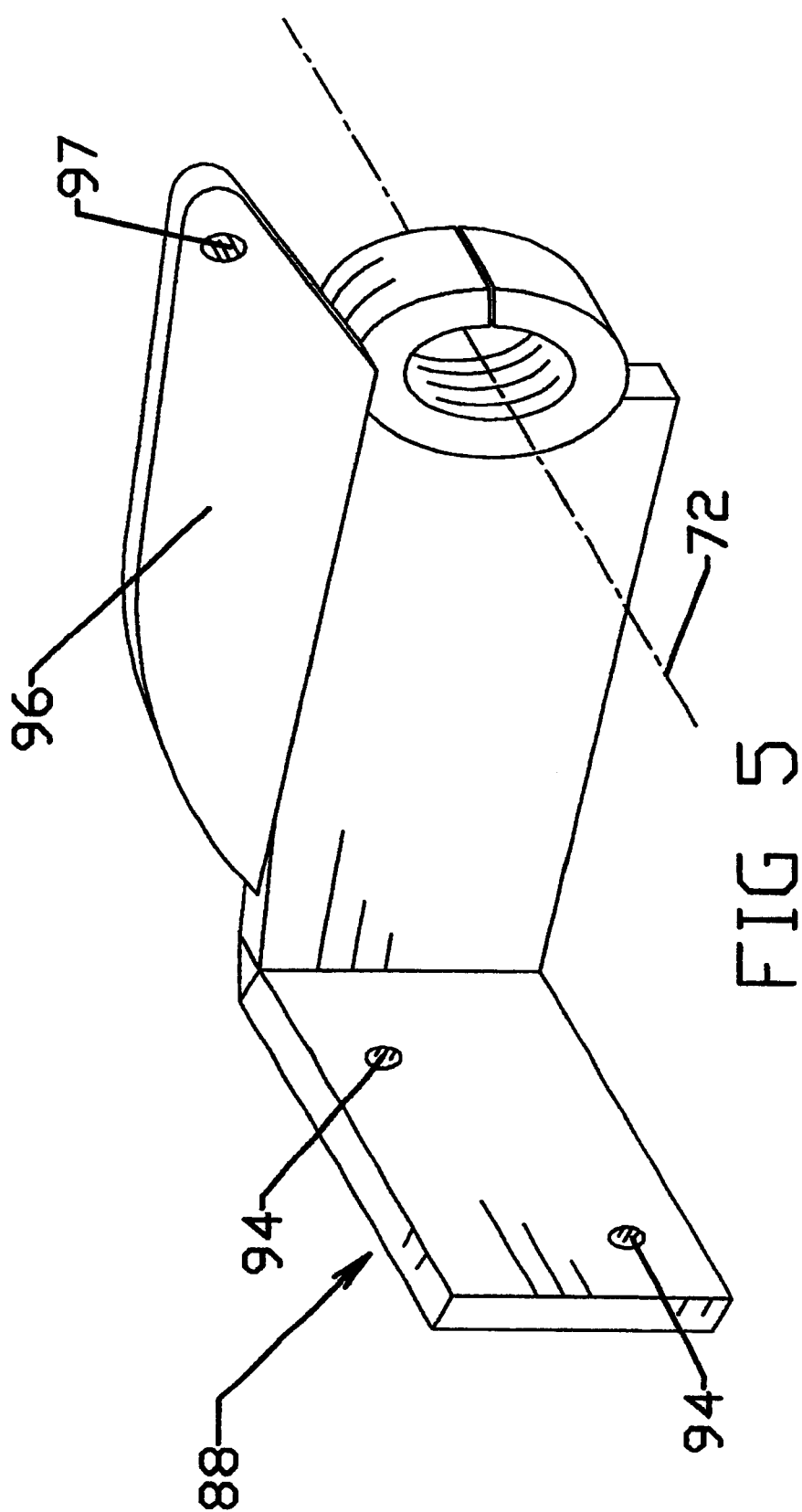
FIG. 5 is an enlarged perspective view of the front portion of the mower yolk.
Figure 6:
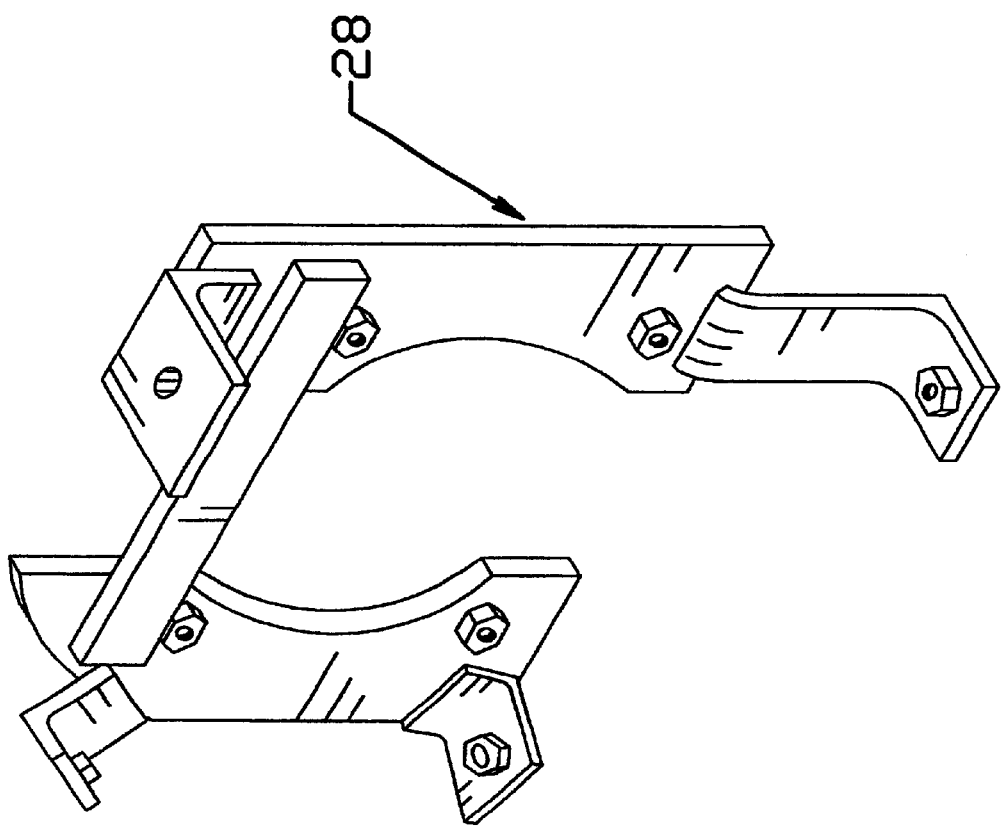
FIG. 6 is an enlarged perspective view of the bearing housing bolt plate.
Figure 10:
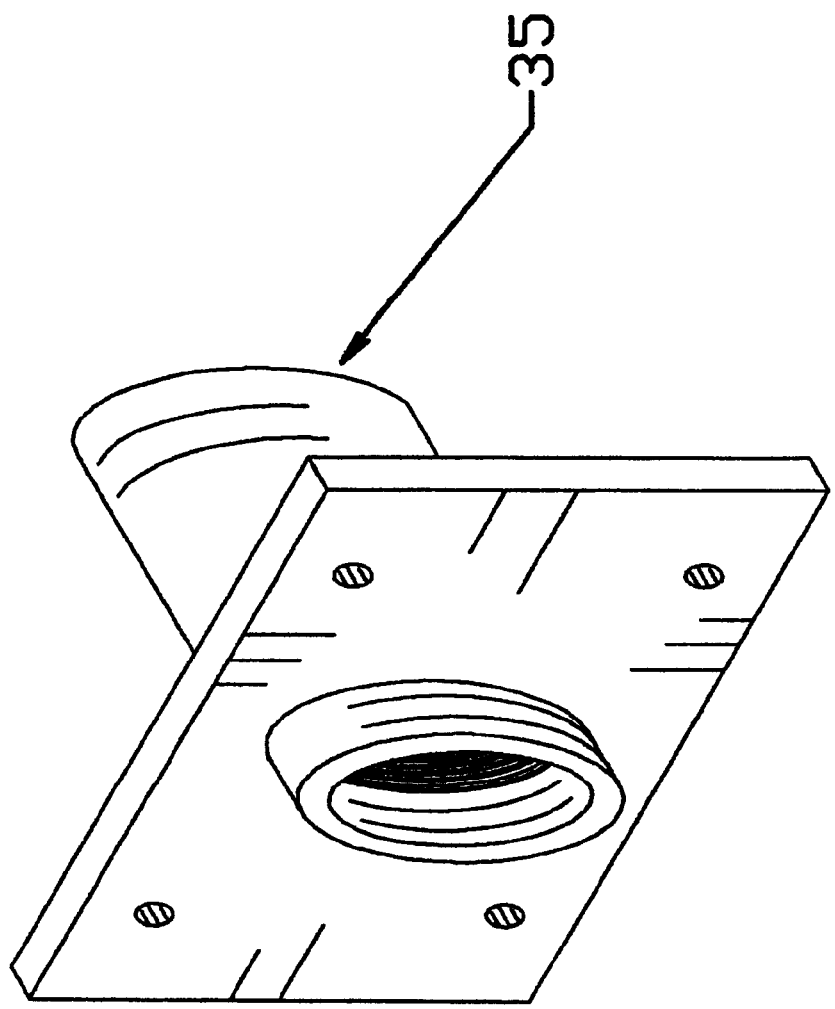
FIG. 10 is an enlarged perspective view of the bearing housing.

Drive shaft 52 is attached to inner arm 24 at bearing housing 35. Bearing housing 35 (shown in FIG. 10) is mounted with brace 48, plate and guard mount 78 and bearing housing bolt plate 28 by bolting together. The bearing housing bolt plate 28, shown in FIG. 6, maintains a close clearance between the guard pulley (not shown) and the pulley 50. The bearing housing bolt plate maintains belt 40 on pulley 50 while operating the cutter bar and rotating it upward as much as about 90°. Transversely mounted on front bearing shaft 23 is V-pulley 50, so that drive shaft 52 drives V-pulley 50. Sickle bar V-pulley 62 is driven by pulley belt 40, which in turn drives cutterbar 30. Rear portion mower yolk 86 nests inside front portion mower yolk 88 and they are bolted together at bolt holes 90 and 94 to form the mower yolk, as shown in FIGS. 4 and 5. Brace 96 welded to yolk 88 is used to hold sickle head 38 when in the upright position. Sickle bar head 38 (in dotted lines) nests inside the mower yolk, and the sickle bar head 38 pivots on bushings 82 and 83.

Figure 3A:
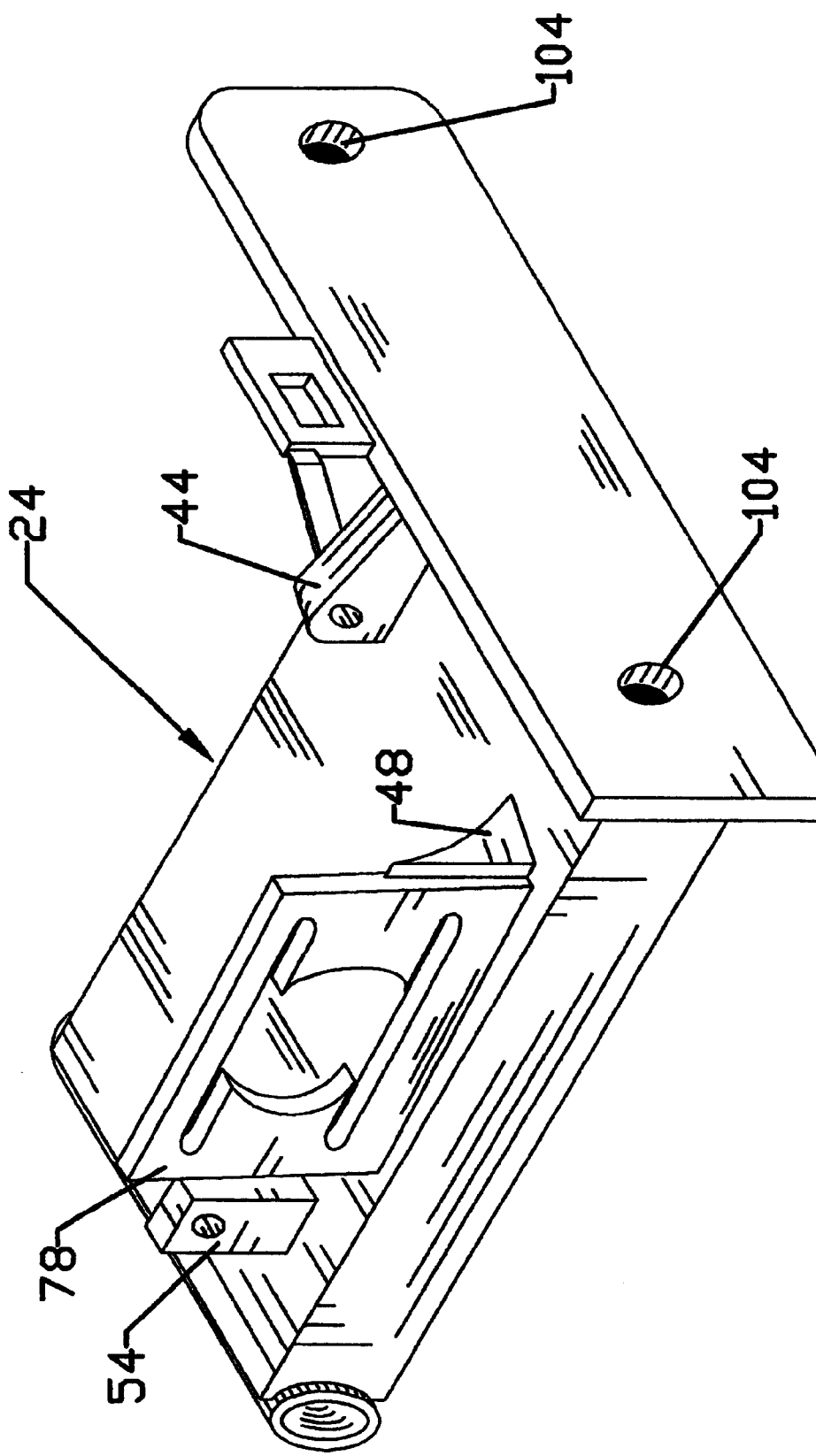
FIG. 3A is an enlarged perspective view of the inner arm.
Figure 3B:
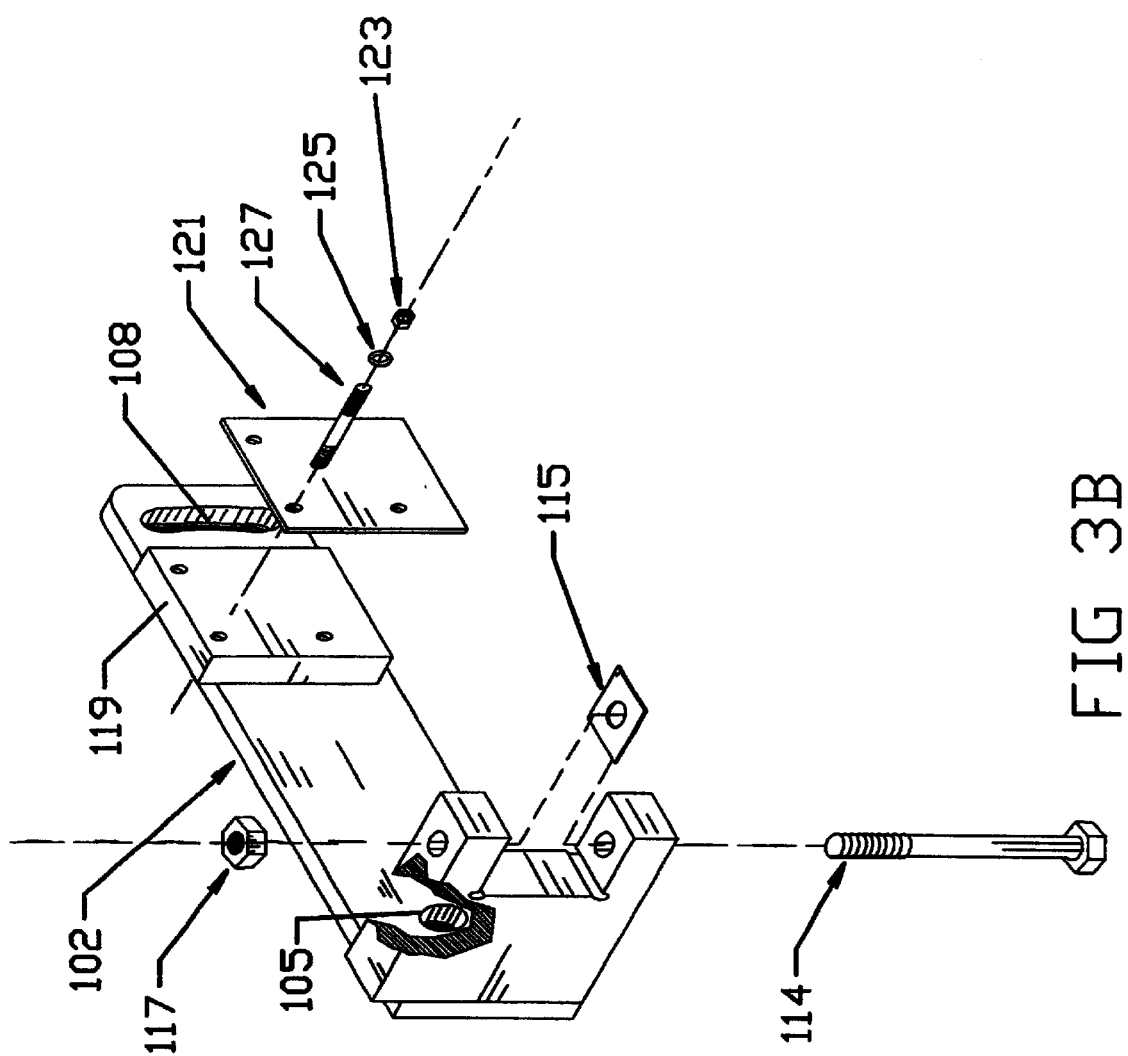
FIG. 3B is an enlarged perspective view of the outer plate.
Figure 9:
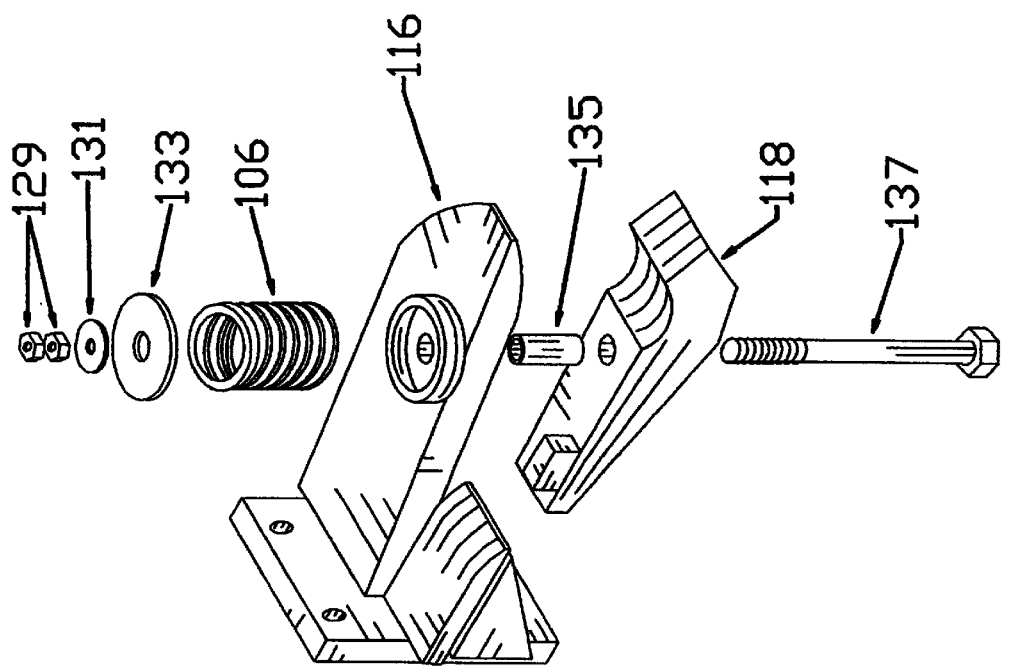
FIG. 9 is an enlarged perspective view of the jaw assembly.

Rear portion mower yoke 86 and front portion mower yoke 88 are mounted on outer plate 102 by bolt 114 and supported in the front by jaw assembly 116 and 118 (shown in FIG. 9). Outer plate 102 is mounted on end plate of inner arm 24 by two bolts (not shown) at belt holes 104 and 105 and slot 108 (see FIGS. 3A and 3B) and held in place by adjustment nut 110 as shown in FIG. 2B. Mounted on outer plate 102 is mounting block 119 and shim 117 held in place by stud 127 and lock washer 125, and fastened with nut 123.

Telescoping hydraulic cylinder 64 (shown in FIG. 7A) is mounted between trunnion supports 74 and 75. Said support are welded to rear portion mower yoke 86. The ram 66 of hydraulic cylinder 64 is attached to chain 68, which in turn is attached to sickle bar head 38. When hydraulic cylinder 64 is extended, sickle bar head 38 rotates at 72 (dashed line) downward, rotating cutterbar 30 as much as 50° below horizontal. When hydraulic cylinder 64 retracts, cutterbar 30 is rotated upward above the horizontal.

When hydraulic cylinders 46 and 64 are both fully retracted, cutterbar 30 is rotated about 90° upward to be completely vertical, while operating cutterbar 30. When hydraulic cylinders 46 and 64 are both fully extended, cutterbar 30 is rotated about 60° below horizontal. The full range of rotation for cutterbar 30 is greater than about 140°, while the cutterbar 30 is operating.

Figure 8:
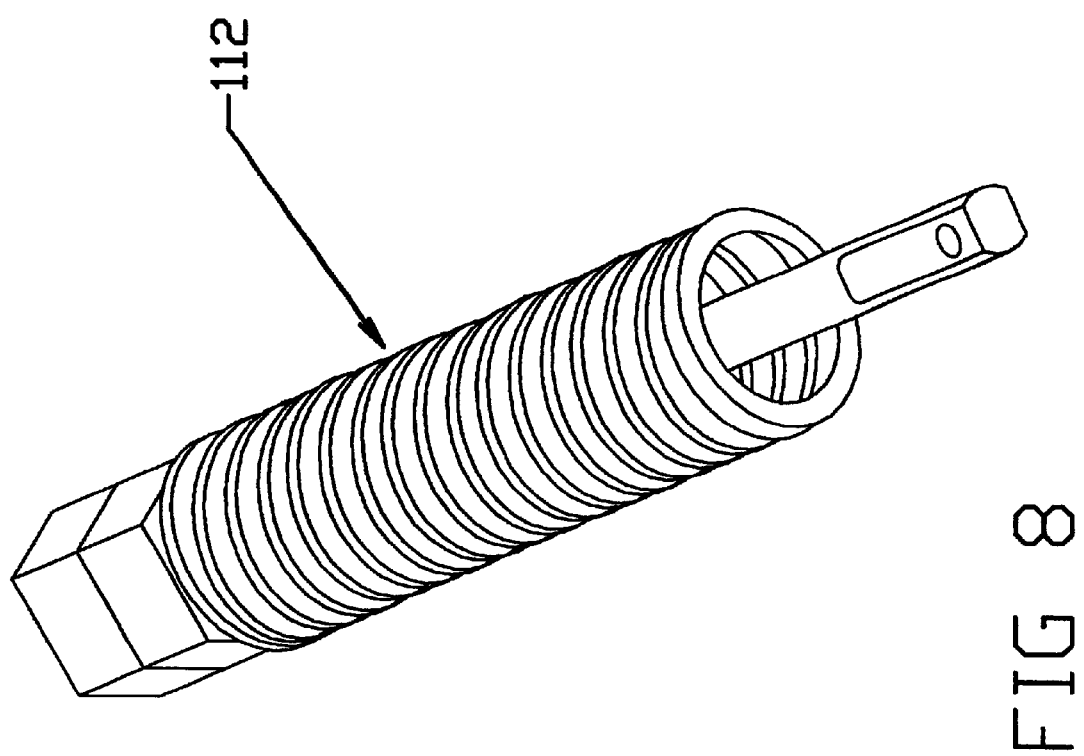
FIG. 8 is an enlarged perspective view of the travel stop.

Optionally, the present sickle bar mower may have a trip jaw assembly 116 attached to outer plate 102 by bolts, 120. Said assembly works with latch 118 to release the yoke assembly when the sickle bar 30 strikes a heavy or immovable object. The yoke, along with the sickle bar head 38 rotate on pivot bolt 114 which passes through thrust shim 115, outer plate 102 and rear yolk 86 and is fastened with nut 117. The trip jaw assembly 116 thereby protects sickle bar 30 from damage. The tension on the trip jaw assembly can be adjusted by spring 106 attached to the trip jaw assembly 116 which is held in place by nuts 129, flat washer 131, adjusting cap 133, spring tension limit tube 135 and bolt 137. Travel stop 112 (shown in FIG. 8) on rear mower yoke 86 passes through the rectangular hole in end plate of inner arm 24 and stops rear mower yoke 86 and front mower yoke 88 limiting the travel of cutterbar 30 when the bar swings back.

A further option is a curved slot 108 on the outer plate 102 which, along with adjustment nut 110, allows the front edge of sickle mower 30 to be tilted up or down to allow for different tire sizes on the tractor.

Optionally, cutterbar 30 can be locked in the upright (vertical) position when cut off by means of two locking pins or bolts. With the first pin, brackets 56 on base plate 22, can be aligned with the locking boss 54 on the inner arm 24 at opening 58. At the opening 58, said bolt or pin can be inserted to lock the inner arm in the up position. The second optional pin can be inserted through hole 97 in brace 96 (see FIG. 5) and through a hole in the cutterbar head (not shown). This keeps the cutterbar from rotating downward when not in use.

As shown in FIG. 2A, the inner arm hydraulic cylinder 46 and the bar hydraulic cylinder 64 are operated using levers 27 and 29, respectively. Hydraulic lines 37 and 39 run from hydraulic valve body 41 to hydraulic cylinders 46 and 64, respectively. Hydraulic pressure is provided by hydraulic pressure line 31 and return line 33. The hydraulic lines run through hydraulic valve body assembly 41, which translates the position of levers 27 and 29 to the hydraulic pressure of hydraulic lines 37 and 39. The levers 27 and 29 are supported by brace 25 which is mounted on the top of differential housing 18 and the outside of the right fender (not shown).

The present invention has been described with reference to various specific embodiments. However, many variations and modifications may be made while remaining within the scope of the invention.

What is claimed is:

1. A mower attachment for a tractor comprising:

a base plate that can be attached to the side of the tractor;

an inner arm rotatably attached to the base plate, wherein the inner arm has an end plate;

an outer plate attached to the end plate of the inner arm;

first hydraulic cylinder having a first and second end wherein the first end is attached to the base plate, and the second end is attached to the inner arm;

a mower yoke attached to the outer plate; and an oscillating sickle with a sickle head and a cutterbar, wherein the sickle head rotatably nests in the mower yoke, wherein the mower yoke is comprised of a rear portion mower yolk and a front portion mower yolk bolted together; and a second telescoping hydraulic cylinder mounted between trunnion supports attached to the rear portion mower yolk, wherein the ram of the second hydraulic cylinder is attached to the sickle head, and wherein the first and second hydraulic cylinders can be retracted or extended, causing the cutterbar to rotate from about 90° above horizontal to about 60° below horizontal while the sickle is operating.

2. The attachment of claim 1, wherein the outer plate has attached thereto a trip jaw assembly.

3. The attachment of claim 1, wherein the outer plate has attached thereto a curved slot with an adjustment nut to allow the oscillating sickle to be tilted up or down.

4. The attachment of claim 1, wherein the cutterbar can be locked upright by means of locking pins or bolts when not in use.

5. The attachment of claim 1, wherein the base plate is attached to a tractor.

\* \* \* \* \*